United States Patent [19]
George et al.

[11] 3,728,511
[45] Apr. 17, 1973

[54] CONTROL WITH ROTOR AND SHAFT ASSEMBLY

[75] Inventors: Lee R. George; Edgar F. Hauenstine, both of Frankfort, Ind.

[73] Assignee: P. R. Mallory & Co. Inc., Indianapolis, Ind.

[22] Filed: Jan. 31, 1972

[21] Appl. No.: 222,057

[52] U.S. Cl. ........................ 200/168 B, 200/172 R
[51] Int. Cl. ........................................... H01h 3/08
[58] Field of Search .................. 200/172 A, 172 R, 200/11 R, 11 A, 16 A, 168 R; 338/174

[56] References Cited

UNITED STATES PATENTS

| | | | |
|---|---|---|---|
| 3,609,260 | 9/1971 | Lipschultz | 200/168 B |
| 3,511,956 | 5/1970 | Fields | 200/172 R |
| 2,863,030 | 12/1958 | Page | 338/174 |

*Primary Examiner*—H. O. Jones
*Attorney*—Richard H. Childress et al.

[57] ABSTRACT

A control having a rotor and shaft assembly anchored together to prevent axial separation and relative rotation between the shaft and the rotor.

10 Claims, 5 Drawing Figures

PATENTED APR 17 1973 3,728,511

3,728,511

CONTROL WITH ROTOR AND SHAFT ASSEMBLY

This invention relates to a novel control. More particularly, it relates to a rotor and shaft sub-assembly and coupling means therefor.

Controls such as variable resistors are utilized extensively throughout the audio and video industry for controlling such products as car radios, televisions, tape recorders and various other devices. The majority of these products are of the portable or mobile type, and are subjected to environments wherein the control member could be abused or misused causing possible damage to the control.

Furthermore, the requirements and standards set forth by the industry utilizing the variable control resistors requires that the rotor and shaft of the control be retained in a manner that will withstand assembling to a chassis or a dash without damage. Such is the case of the assembling of a car radio into an automobile dashboard. At certain points in this assembly, the entire radio would be lifted, carried or supported by the control shaft alone. This is a result of the fact that the control shafts are the only portion of the radio that extend through the dashboard.

The industry also must be assured that the control will withstand axial force applied to the shaft while being actuated by automatic control testing equipment within their facilities.

The present invention, therefore, is concerned with providing a variable resistor control having a control shaft for actuating the control which will withstand forces applied to it in manufacture and in domestic use.

It is an object of this invention to provide a positive coupling means for attaching a metal control shaft to an insulative rotor.

A further object is to provide a coupling between a rotor and a control shaft remote from the rear face of the rotor so that the area beyond the rotor can be utilized for a bearing support.

Still another object of the invention is to provide a control sub-assembly with means incorporated in the design so as to be easily adapted to automatic assembly equipment.

Another object is to provide a coupling between the shaft and rotor of a control which will prevent axial separation and rotation between the rotor and shaft.

A further object is to provide a coupling between a rotor and a shaft for a control that requires a small amount of force to assemble in relationship to the force required to disassemble.

A further object of the invention is to provide a rotor and shaft assembly that is clean and neat and clear of clutter of exterior surfaces so as to be capable of incorporation into existing variable resistor control units.

These and other objects of the invention will become more apparent from the following description and accompanying drawings wherein.

Generally speaking, the present invention provides a means for coupling a shaft to a rotor in a control. A mounting bushing is provided for supporting a frame plate. The frame plate supports and closes a cup-shaped housing and carries an electrically insulated board with a portion of the board extending through the housing. Carried on the insulated board is a resistive path and a common center ring. A rotor sub-assembly is rotationally carried in the mounting bushing and may be journalled in the cup-shaped housing at one end of the shaft. The rotor and shaft of the control are anchored together by an anchoring means on the shaft and a means in the rotor for receiving the anchor. The rotor is formed of a suitable plastic such as nylon or other known materials that will cold flow around the anchor means on the shaft. Nylon would be preferred because of its inherent characteristic to return to its original position after being displaced, a characteristic which, as will become apparent, is desirable in the present construction. Optional materials can be used that would require slight heating of the insulative rotor or shaft to help the flow of material around the anchor. The anchor means provides a coupling of the shaft and rotor that is substantially effortless to assemble but will require a great deal of force to separate.

The rotor may have provisions thereon for actuating a control switch in tandem with the variable resistor unit. Also located on the rotor is a contact means for completing an electrical circuit to transfer the current from a selected amount of resistance on a resistance path to external terminals.

Figure 1:
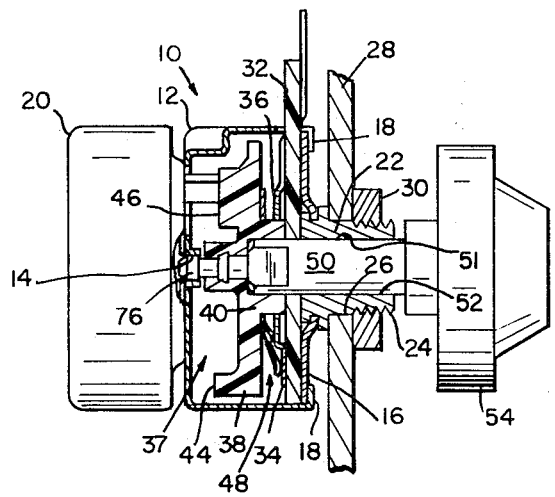
FIG. 1 is a cross section of a variable resistor control in combination with a switch.

Referring now to the drawings and more specifically to FIG. 1, the variable resistance control means 10 includes a cup-shaped housing 12. The housing 12 is provided with a bearing aperture 14. Housing 12 is closed at its open end by a frame plate 16 and is secured to plate 16 by tab 18. A line switch 20 is attached to housing 12 by suitable means such as by welding, riveting, or by tabs and the like (not shown). Rigidly attached to plate 16 is a mounting bushing 22. Mounting bushing 22 is provided with an externally threaded distal end 24 which extends through an aperture 26 in a standard chassis or control panel 28. Control 10 is secured to the chassis 28 by a threaded nut 30. Provided inside the variable control is an insulated board 32 which is provided with a variable resistance path 34 and a common center contact ring 36.

Figure 2:
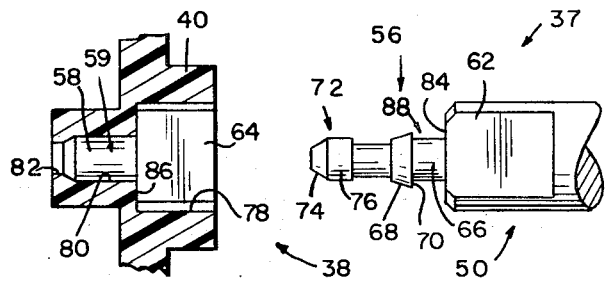
FIG. 2 is an exploded side elevation, in section, of a rotor and control shaft aub-assembly.
Figure 3:
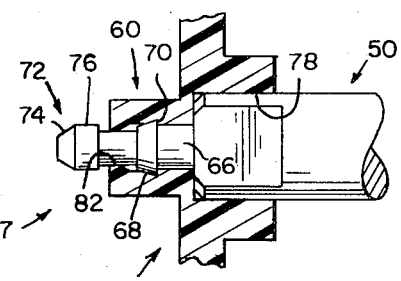
FIG. 3 is a sectional view of the rotor and control shaft sub-assembly in the assembled position.

The variable resistance control also includes a sub-assembly 37 which includes a rotor means 38 and a shaft means 50. Rotor means 38 comprises a hub portion 40, a rotational limiting boss 44, a boss 46 for actuating the switch 20, and wiper contacts 48 engaging resistive path 34 and contact ring 36. The present invention deals with the type of variable resistor that is controlled from outside the housing with such control being provided by shaft means 50. Rotation of the rotor causes wiper contacts to wipe over resistance path 34 and center contact ring 36. Referring to FIGS. 2 and 3, shaft means 50 includes a main bearing surface 51 which is carried in a central bore 52 of mounting bushing 22, bearing head means 72, a pair of opposed flats 62 which mate with flats 64 in a first opening 78 of hub 40 to prevent rotation between the shaft means 50 and rotor means 38, and fluke anchoring means 56.

An optional bearing surface may be obtained by bearing head means 72. Bearing head means 72 has a conical face 74 which aids in aligning and assisting the entering of the shaft means into shaft retaining cavity 58. Also provided on bearing head means 72 is a bearing surface 76 which is carried in the bearing aperture 14 shown in FIG. 1. Manual rotation of the shaft means 50 is obtained through a knob 54 mounted on one of the distal ends of the shaft means 50.

The rotor means 38 is connected to shaft means 50 through coupling means 60. Coupling means 60 is obtained through fluke anchoring means 56 in cooperation with shaft retaining cavity 58.

Fluke anchoring means 56 comprises a flared section comprising a conical surface 68 terminating in a face 70. Face 70 merges into step-down diameter 66 on shaft means 50 to provide a resistance surface as will be discussed later.

Shaft retaining cavity 58 comprises a first opening 78 with flats 64, floor 86 and bore 80 extending through floor 86 to provide a shaft retaining portion 59.

Figure 4:
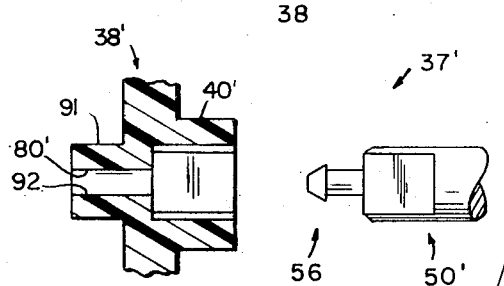
FIG. 4 is an exploded view of a modification of the sub-assembly.
Figure 5:
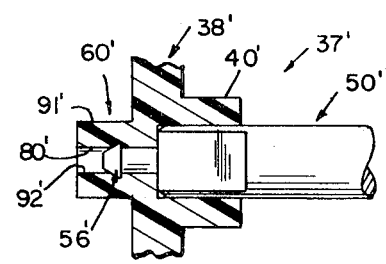
FIG. 5 is a view similar to FIG. 4 but in the assembled position.

Illustrated in FIGS. 4 and 5 is a modification of sub-assembly 37. Sub-assembly 37' is comprised of a rotor means 38' and a shaft means 50'. A coupling means 60' comprises a fluke anchor means 56' and cooperating bore 80' in the hub 40'. The sub-assembly 37' is also provided with an external bearing surface 91 and an optional internal bearing surface 92, either of which could provide a bearing surface with the housing 12.

OPERATION

The assembly of the sub-assembly 37 shown in FIG. 1–3 is as follows: Bearing head means 72 enters the hub 40 by passing through enlarged opening 78 and into reduced bore 80. The internal diameter of the bore 80 is substantially the same as the outside diameter of the head means 72. The head means 72 continues to penetrate the bore 80 with the head being forced through a narrow window 82, the window being slightly displaced. As the head means 72 enters the window 82, the fluke anchor means 56 enters the bore 80. The fluke anchor means 56 is of a larger diameter near the face 70 than bore 80. Therefore, the surface of the bore 80 must be displaced. Such displacement may be through cold flowing of such surface. This is achieved without destroying the surface of the bore 80 by way of the ramping action of the conical face 68. Bearing head means 72 clears the window 82 and the fluke anchor means proceeds through the bore 80 until the end face 84 of the control shaft means 50 abuts the floor 86 inside the opening 78 and comes to rest as shown in FIG. 3.

The rotor means 38, if made by nylon, will cold flow around the fluke anchor means 56, especially into the step down area 88, and against face 70, thus preventing the withdrawal of the fluke anchor means 56 from the rotor means 38. Nylon is preferred due to its ability to return to its original shape without distortion.

Should a constant force be applied to the shaft in the direction opposite to that of assembly over an extended period, cold flowing of the surface of bore 80 or retaining portion 59 could occur. The shaft would then be slowly withdrawn from the rotor until the head means 72 abuts the face 90 of the rotor means 38 to therefore prevent total removal of the shaft from the rotor.

Shown in FIGS. 4 and 5 is a modification of the sub-assembly 37 as previously described wherein the head means 72 is deleted. This unit is assembled in the same manner as the first embodiment. This assembly wound find its way into control units of the type that do not require a rigid bearing means such as provided at bearing surface 76. The second embodiment does, as previously noted, provide external bearing surface 91 or an internal bearing surface 92 of a material which is self lubricating and silently running for units that demand such characteristics.

Herewith is provided a means for coupling a shaft to a rotor and anchoring them together to prevent axial withdrawal, prevent relative rotational movement between the rotor and the shaft, and provide a design such that the rotor and shaft can be assembled together by one clean movement.

What is claimed is:

1. In a control means wherein electrical contacts carried by a rotor engage resistance paths upon rotation of said rotor; a means coupling said rotor to a shaft means comprising:
   fluke anchoring means carried by said shaft means engaging a shaft retaining cavity in said rotor and displacing at least a portion thereof so as to axially retain said fluke anchoring means within said shaft retaining cavity.

2. A control means according to claim 1 wherein said shaft retaining cavity is a bore of said rotor.

3. A control means according to claim 1 wherein said fluke anchoring means includes a flared section of said shaft means.

4. In a control means according to claim 3 wherein said flared section of said shaft means is a cone.

5. In a control means according to claim 3 wherein said flared section terminates in a sharp step providing a resistance of axial movement in a predetermined direction.

6. In a control means according to claim 1 wherein said displacement of said shaft retaining cavity is by cold flow.

7. In a control means according to claim 1 wherein said rotor is a plastic material which tends to return to its prior condition upon said displacement.

8. In a control means according to claim 1 wherein said shaft retaining cavity includes flat portions cooperating with corresponding flat portions of said shaft means to prevent relative rotation between said rotor and shaft means.

9. In a control means according to claim 2 wherein said shaft means further includes a bearing head means at one end thereof and extending beyond said bore.

10. In a control means wherein electrical contacts carried by a rotor engage resistance paths upon rotation of said rotor; a means coupling said rotor to a shaft means comprising;
   fluke anchoring means carried by said shaft means engaging a shaft retaining cavity in said rotor and displacing at least a portion thereof so as to axially retain said fluke anchoring means within said cavity,
   and a head at one end thereof extending beyond a bore of said rotor adjacent a face of said rotor.

* * * * *